(12) United States Patent  
Hayashimoto

(10) Patent No.: US 7,649,592 B2
(45) Date of Patent: Jan. 19, 2010

(54) BACKLIGHT UNIT AND LIQUID CRYSTAL DISPLAY DEVICE

(75) Inventor: Seiji Hayashimoto, Tokyo (JP)

(73) Assignee: Sony Corporation (JP)

( * ) Notice: Subject to any disclaimer, the term of this patent is extended or adjusted under 35 U.S.C. 154(b) by 101 days.

(21) Appl. No.: 11/906,763

(22) Filed: Oct. 3, 2007

(65) Prior Publication Data

US 2008/0123020 A1    May 29, 2008

(30) Foreign Application Priority Data

Oct. 4, 2006    (JP) .......................... P2006-272782

(51) Int. Cl.
    *G02F 1/1335*    (2006.01)
(52) U.S. Cl. ...................................... 349/67
(58) Field of Classification Search .................. 349/67
    See application file for complete search history.

(56) References Cited

U.S. PATENT DOCUMENTS 6,412,969 B1 *    7/2002    Torihara et al. ............. 362/609

7,185,995 B2 *    3/2007    Hatanaka et al. ............... 362/29

FOREIGN PATENT DOCUMENTS

| JP | 05-113565 A | 5/1993 |
| JP | 5-119316 A | 5/1993 |
| JP | 05-075490 A | 3/2001 |

* cited by examiner

*Primary Examiner*—Uyen-Chau N Le
*Assistant Examiner*—Hoang Tran
(74) *Attorney, Agent, or Firm*—Lerner, David, Littenberg, Krumholz & Mentlik, LLP

(57) ABSTRACT

A backlight unit for use in a liquid crystal display device is disclosed. The backlight unit which may include a reflection plate; a plurality of fluorescent tubes; and a diffusion plate. The reflection plate may include a rectangular-shaped bottom plate section, four side plate sections respectively formed upright from four sides of the bottom plate section with a skew in the direction of moving away from the bottom plate section, and an edge plate section that protrudes from a tip end of each of the side plate sections toward outside thereof.

13 Claims, 3 Drawing Sheets

BACKLIGHT UNIT AND LIQUID CRYSTAL DISPLAY DEVICE

CROSS-REFERENCE TO RELATED APPLICATIONS

This application claims priority from Japanese Patent Application No. JP 2006-272782 filed in the Japanese Patent Office on Oct. 4, 2006, the entire content of which is incorporated herein by reference.

BACKGROUND OF THE INVENTION

1. Field of the Invention

The present invention relates to a backlight unit, a liquid crystal display device, and a reflection plate.

2. Description of the Related Art

A liquid crystal display device which can be used as a display unit of a television unit and a personal computer has been available.

Such a liquid crystal display device is configured to include a chassis, a liquid crystal panel, and a backlight unit. The liquid crystal panel is equipped inside the chassis in such a manner that the display screen thereof is faced to a front aperture of the chassis. The backlight unit is disposed inside the chassis and at the rear of the liquid crystal panel.

The backlight unit is provided with a reflection plate, a plurality of fluorescent tubes, and a diffusion plate. The backlight unit is so configured as to expose the diffusion plate with lights coming from the fluorescent tubes using the reflection plate, and direct the lights diffused by the diffusion plate to the liquid crystal panel. For more details, refer to Patent Document 1 (JP-A-5-113565) and Patent Document 2 (JP-A-2001-75490).

The reflection plate is configured to include a rectangular-shaped bottom plate, four sloped plates with a skew in the direction of moving away from the four sides of the bottom plate section, and an edge plate section that protrudes from a tip end of each of the sloped plates toward outside thereof. The bottom plate and the four sloped plates form an open space in the direction of the liquid crystal panel, and a plurality of fluorescent tubes are disposed in the space parallel to the bottom plate.

A side which is one of the sides of the edge plate section in the thickness direction and is located away from the bottom plate is formed as an abutment plane against which the diffusion plate is abutted, and four sides of the rectangular-shaped diffusion plate are abutted against the abutment plane of the reflection plate.

SUMMARY OF THE INVENTION

When a liquid crystal panel is viewed from the side of a display screen, if a portion of the abutment plane of the diffusion plate is perceived as a shadow, an image displayed on the liquid crystal panel does not look good. In consideration thereof, the front panel in the shape of a rectangular frame configuring the chassis is used to cover the portion of the four sides corresponding to the abutment plane of the reflection plate.

On the other hand, for size increase of the display screen of the liquid crystal panel with size reduction of the liquid crystal display device at the same time, there needs to reduce the width of the rectangular-frame-shaped front panel by reducing the width of the abutment plane of the reflection plate against which the diffusion plate is abutted.

The issue here is that the diffusion plate to be abutted onto the reflection plate is required to be of a specific size in terms of an overlap amount to achieve stable placement of the diffusion plate. There have been also limitations of reducing the width of the abutment plane of the reflection plate.

It is thus desirable to provide a backlight unit, a liquid crystal display device, and a reflection plate that are advantageous for size increase of the display screen of a liquid crystal panel and for size reduction of the liquid crystal display device.

According to an embodiment of the present invention, there is provided a backlight unit for use in a liquid crystal display device, which may include a reflection plate; a plurality of fluorescent tubes; and a diffusion plate. In the backlight unit, the reflection plate is configured to include: a rectangular-shaped bottom plate section; four side plate sections respectively formed upright from four sides of the bottom plate section with a skew in the direction of moving away from the bottom plate section; and an edge plate section that protrudes from a tip end of each of the side plate sections toward outside thereof. An open space may be formed by the bottom plate section and the four side plate sections in the tip end direction of the side plate sections, the fluorescent tubes may be disposed above the bottom plate section in the space, a side which is one of the sides of the edge plate section in the thickness direction and is located away from the bottom plate section may be formed as a first abutment plane against which the diffusion plate is abutted, at a portion of at least one of the four side plate sections closer to an inner plane of the edge plate section facing the space, a rib may protrude from the inner plane in the direction to the space, an end portion where the rib is away from the bottom plate section may extend on a plane same as the first abutment plane, and may be formed as a second abutment plane for abutment by the diffusion plate, and the diffusion plate may be disposed by being abutted against the first abutment plane at four sides, and by being abutted against the second abutment plane thereat.

According to another embodiment of the present invention, there is provided a liquid crystal display device, which may include a chassis; a liquid crystal panel equipped inside the chassis with a display screen thereof facing a front aperture of the chassis; and a backlight unit disposed inside the chassis and at the rear of the liquid crystal panel. In the liquid crystal display device, the backlight unit may include a reflection plate; a plurality of fluorescent tubes; and a diffusion plate. The reflection plate may be configured to include: a rectangular-shaped bottom plate section; four side plate sections respectively formed upright from four sides of the bottom plate section with a skew in the direction of moving away from the bottom plate section; and an edge plate section that protrudes from a tip end of each of the side plate sections toward outside thereof, an open space is formed by the bottom plate section and the four side plate sections in the direction of the liquid crystal panel, the fluorescent tubes are disposed above the bottom plate section in the space, a side which is one of the sides of the edge plate section in the thickness direction and is located away from the bottom plate section is formed as a first abutment plane against which the diffusion plate is abutted, at a portion of at least one of the four side plate sections closer to an inner plane of the edge plate section facing the space, a rib is protruded from the inner plane in the direction to the space, an end portion where the rib is away from the bottom plate section is extended on a plane same as the first abutment plane, and is formed as a second abutment plane for abutment by the diffusion plate, and the diffusion plate is disposed by being abutted against the first abutment plane at four sides, and by being abutted against the second abutment plane thereat.

According to a still another embodiment of the present invention, there is provided a reflection plate configuring a backlight unit for use in a liquid crystal display device, being made of a material with a high reflection coefficient, and which may be configured to include: a rectangular-shaped bottom plate section; four side plate sections respectively formed upright from four sides of the bottom plate section with a skew in the direction of moving away from the bottom plate section; and an edge plate section that protrudes from a tip end of each of the side plate sections toward outside thereof. In the reflection plate, a space for placement of a fluorescent tube may be formed open by the bottom plate section and the four side plate sections in the tip end direction of the side plate sections, a side which is one of the sides of the edge plate section in the thickness direction and is located away from the bottom plate section may be formed as a first abutment plane, at a portion of at least one of the four side plate sections closer to an inner plane of the edge plate section facing the space, a rib may protrude from the inner plane in the direction to the space, and an end portion where the rib is away from the bottom plate section may be formed as a second abutment plane being extended on a plane same as the first abutment plane.

According to the embodiments of the invention, the overlap amount of a diffusion plate for abutment onto a reflection plate can be kept large without increasing the width of a first abutment surface of the reflection plate.

Accordingly, the liquid crystal display device can be reduced in size, and the display screen of the liquid crystal panel can be increased in area.

DETAILED DESCRIPTION

Described next are embodiments of the invention by referring to the accompanying drawings.

First Embodiment

First of all, described is a television unit 10 of a first embodiment, including a liquid crystal display device 20, a backlight unit 30, and a reflection plate 32.

Figure 1:
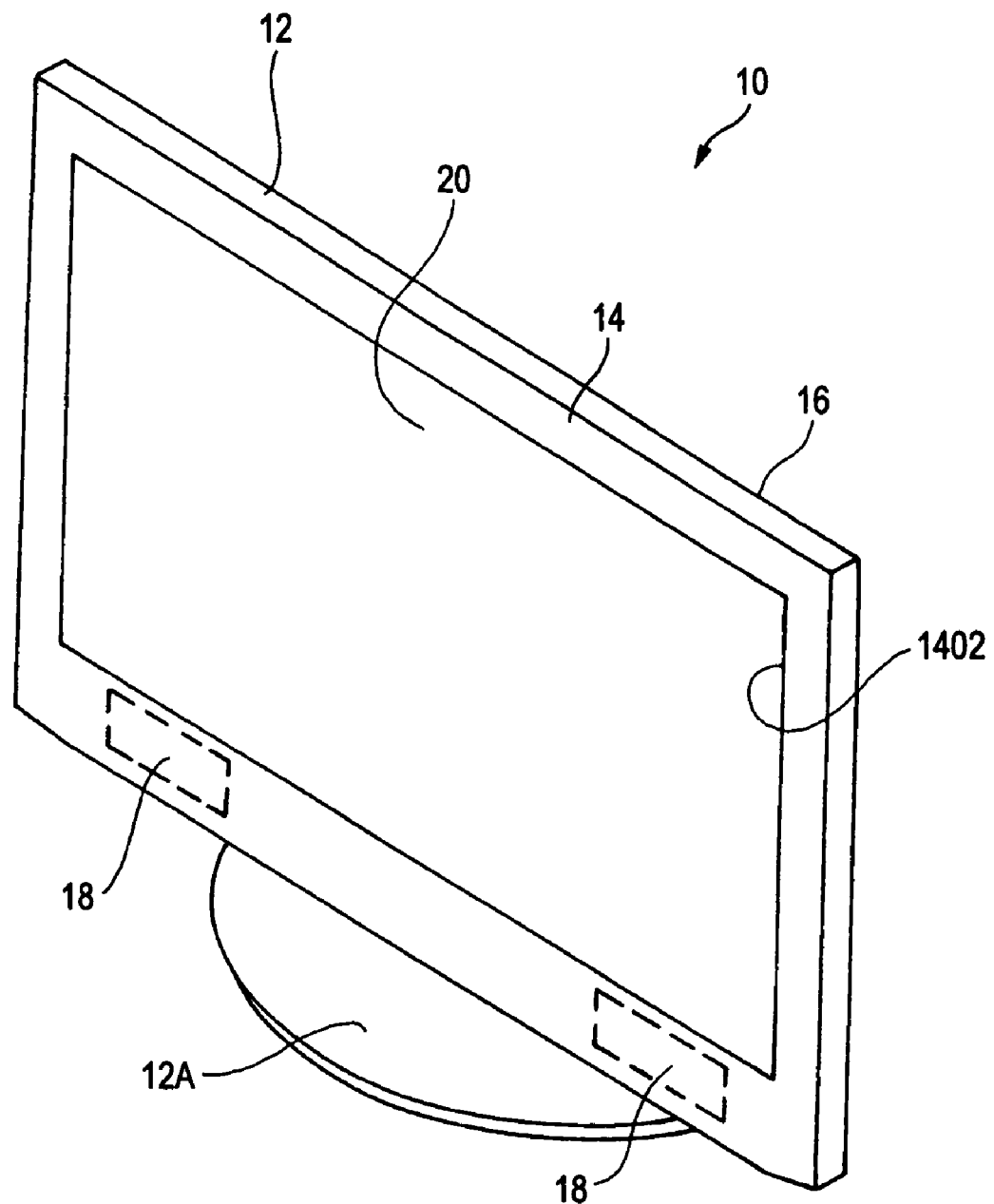
FIG. 1 is a perspective view of a television unit 10 of an embodiment of the invention, including a liquid crystal display device 20, a backlight unit 30, and a reflection plate 32.

FIG. 1 is a perspective view of the television unit 10.

As shown in FIG. 1, the television unit 10 is configured to include a chassis 12 serving as an exterior component, and a base 12A provided at the lower portion of the chassis 12 for abutment against the abutment plane thereof.

The chassis 12 is shaped like a rectangular plate, and includes a front panel 14 and a rear panel 16. In FIG. 1, reference numerals 18 denote right and left speakers.

The front panel 14 is formed with, inside the front surface, a rectangular-shaped aperture 1402, and the liquid crystal display device 20 is incorporated inside the chassis 12.

The liquid crystal display device 20 is configured to include a liquid crystal panel 22, the backlight unit 30, a frame 31, and others.

Figure 2A:
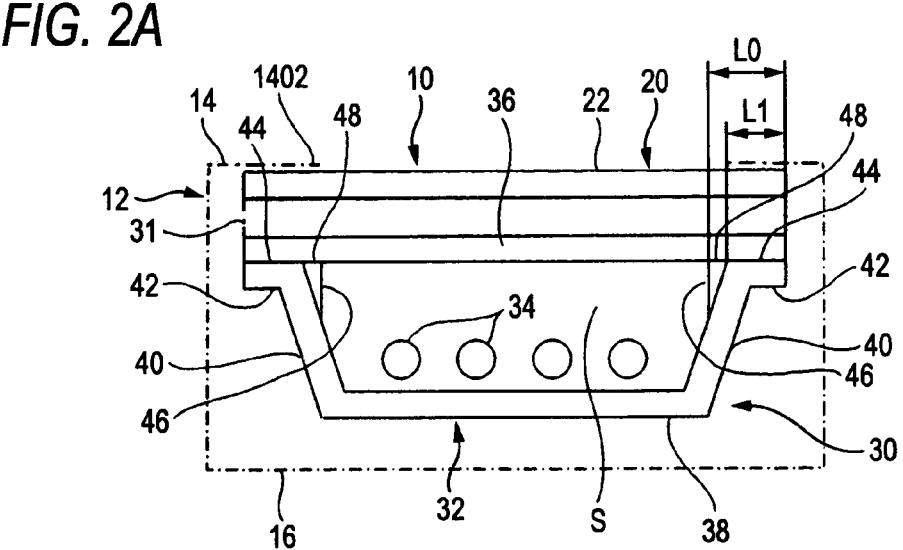
FIG. 2A is a cross sectional view of the liquid crystal display device 20 of a first embodiment of the invention.
Figure 2B:
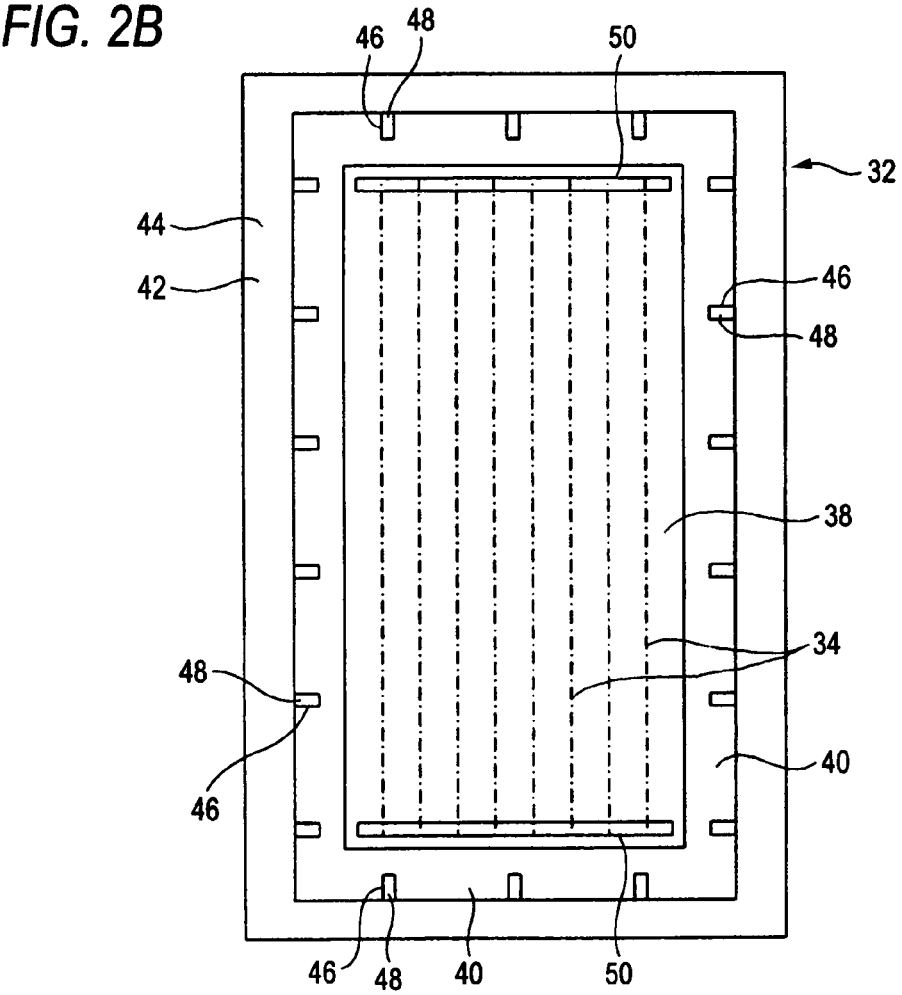
FIG. 2B is a plan view of the liquid crystal display device 20 of FIG. 2B.

FIG. 2A is a cross sectional view of the liquid crystal display device 20 of the first embodiment, and FIG. 2B is a plan view thereof.

As shown in FIGS. 2A and 2B, the liquid crystal panel 22 is so disposed that the display screen thereof is exposed forward from the aperture 1402 via the frame 31.

The liquid crystal panel 22 is configured to include two transparent glass substrates, a liquid crystal layer sandwiched between the glass substrates, a transparent electrode provided to the inner surfaces of the glass substrates, a color filter, a polarization plate, and others.

More in detail, the liquid crystal panel 22 is so configured that two transparent substrates made of glass or others are disposed opposing each other, and a liquid crystal layer filled with a liquid crystal material is provided to a space therebetween.

One of the substrates is formed thereon with signal lines and scan lines in a matrix, switching elements (thin film transistors) disposed at intersections of the signal and scan lines, pixel electrodes, and others. The switching elements are subjected to sequential scanning by the scan lines, and perform writing of video signals to any corresponding pixel electrodes. The video signals are those provided from the signal lines.

The other substrate is formed thereon with opposing electrodes, and a color filter.

The color filter is divided into a plurality of segments corresponding to the pixels, e.g., three filter segments of three primary colors of red, green, and blue.

Such two substrates are sandwiched by two polarization plates.

Note here that such a liquid crystal panel 22 can be of any known various configurations.

Illumination lights coming from the backlight unit 30 illuminate the liquid crystal panel 22 from the rear, i.e., from the rear surface, and in the state, a drive signal for image display is provided to the scan lines, the signal lines, and the opposing electrodes so that the liquid crystal material of the liquid crystal layer is driven. In such a manner, the image is displayed.

Note here that the liquid crystal panel 22 can be of any known various configurations in terms of component placement, e.g., the liquid crystal panel 22 is pinched by the front portion of the frame 31 and a lug piece provided to the frame 31.

The backlight unit 30 is disposed inside the chassis 12 and at the rear of the liquid crystal panel 22.

Note here that the backlight unit 30 can be of any known various configurations in terms of component placement, e.g., the backlight unit 30 is pinched by the rear portion of the frame 31 and a lug piece provided to the frame 31.

The backlight unit 30 is configured to include the reflection plate 32, a plurality of fluorescent tubes 34, and a diffusion plate 36.

The reflection plate 32 is provided for guiding lights coming from the fluorescent tubes 34 through reflection on the diffusion plate 36. In this embodiment, the reflection plate is formed by a white synthetic resin material with a high reflection coefficient. For such a synthetic resin material, various known materials can be used, e.g., polycarbonate resin (PC).

The reflection plate 32 is configured to include a rectangular-shaped bottom plate section 38, four side plate sections 40 respectively formed upright from four sides of the bottom plate section 38 with a skew in the direction of moving away from the bottom plate section 38, and an edge plate section 42 that protrudes from a tip end of each of the side plate sections 40 toward outside thereof.

An open space S is formed by the bottom plate section 38 and the four side plate sections 40 in the tip end direction of the side plate sections 40.

The edge plate section 42 extends throughout the length of the tip end of each of the four side plate sections 40, and forms a rectangular frame when viewed from above.

A side which is one of the sides of the edge plate section 42 in the thickness direction and is located away from the bottom plate section 38 is formed as a first abutment plane 44 against which the diffusion plate 36 is abutted.

In the embodiment, the first abutment plane 44 is extended on a plane parallel to the bottom plate section 38.

The edge plate section 42 extends throughout the length of the tip ends of each of the four side plate sections 40, and is shaped like a rectangular frame when viewed from above. Accordingly, the first abutment plane 44 is also shaped like a rectangular frame.

At a portion of each of the side plate sections 40 closer to an inner surface of the edge plate section 42 facing the space S, a rib 46 is protruded from the inner surface in the direction of the space S.

The rib 46 is provided plurally in the direction along which the edge plate section 42 is extended at regular intervals.

The rib 46 is extended, on each of the side plate sections 40, on the plane orthogonal to the bottom plate section 38.

The end portion where the rib 46 is away from the bottom plate section 38 is extended on a plane same as the first abutment plane 44, and is formed as a second abutment plane 48 for abutment by the diffusion plate 36.

The rib 46 has a length of in the direction protruding into the space S from the inner surface of any of the side plate sections 40, and a width in the direction orthogonal to the protruding direction. The second abutment plane 48 has a width shorter than the length of protruding.

When the reflection plate 32 is viewed from above, the rib 46 is located outside of the bottom plate section 38 but in the outline of the side plate sections 40.

The rib 46 is formed as a piece with the side plate section 40.

In the embodiment, the placement interval of the rib 46 is about 20 to 30 mm, the length of the second abutment plane 48 protruding from the first abutment plane 44 is about 3 to 4 mm, and the width of the second abutment plane 48 (the thickness of the rib 46) is about 1 to 2 mm. Note here that these dimensions can be changed as appropriate in consideration of the size of the diffusion plate 36, for example.

A plurality of fluorescent tubes 34 is disposed on the bottom plate section 38 in the space S.

The fluorescent tubes 34 are each configured by a cold cathode tube (fluorescent lamp) that emits lights of white through supply of a current.

More in detail, the fluorescent tube 34 is formed with an electrode at both sides, and the inner wall is coated with a predetermined fluorescent material. The tube is filled with a noble gas such as Hg (mercury) and Xe (xenon). In response to a current flow through the electrodes in the fluorescent tube 34, thermal electrons are emitted in the tube from a filament so that a discharge is started. In response, the thermal electrons collide with Hg atoms in the tube and thus are excited, and emit ultraviolet rays. The Hg atoms are put in the ground state through emission of the ultraviolet rays. The ultraviolet rays are absorbed by the fluorescent material coated on the wall of the tube so that lights of white are emitted to the outside.

In the embodiment, the fluorescent tube 34 is disposed through attachment, at both ends in the longitudinal direction, onto the bottom plate section 38 via a holder 50. Note here that such a fluorescent tube 34 can be of any known various configurations in terms of component placement.

The diffusion plate 36 diffuses lights for exposing the liquid crystal panel 22 thereto from the rear, and is made of a translucent material. The lights include those coming from the fluorescent tubes 34, and those reflected by the reflection plate 32 onto the diffusion plate 36.

The translucent material configuring such a diffusion plate 36 includes, possibly, a polystyrene resin, an MS (styrene-methyl methacrylate) resin, or others.

In the embodiment, an optical sheet (not shown) is provided on the plane where the diffusion plate 36 is facing the liquid crystal panel 22 for guiding the lights coming from the diffusion plate 36 to the liquid crystal panel 22. Note here that the diffusion plate 36 can be of any known various configurations.

The diffusion plate 36 is shaped like a rectangular plate, and is so disposed that the four sides thereof are abutted against the first and second abutment planes 44 and 48.

The diffusion plate 36 can be of any known various configurations in terms of component placement, e.g., the four sides are abutted against the first and second abutment planes 44 and 48 using a holder, a lug piece, and others embedded in the frame 31 and the reflection plate 32.

According to the first embodiment, compared with the previous technologies in which the diffusion plate 36 is abutted against, at four sides, only the first abutment plane 44 of the reflection plate 32, the four sides of the diffusion plate 36 are abutted against both the first and second abutment planes 44 and 48 of the reflection plate 32. With such a configuration, the area on the reflection plate 32 where the diffusion plate 36 is abutted can be large in size, thereby leading to advantages of being able to stably dispose the diffusion plate 36 with no rattle on the reflection plate 32.

Moreover, because the second abutment plane 48 is small in size, when viewed from the side of the display screen of the liquid crystal panel 22, the portion of the second abutment plane 48 is not perceived as a shadow, thereby causing no influence over images to be displayed on the display screen of the liquid crystal panel 22.

Especially in the first embodiment, the second abutment plane 48 has a width smaller than the protruding length thereof so that this is considered advantageous in view of preventing any influence over the images to be displayed on the display screen of the liquid crystal panel 22.

What is more, the rib 46 is extended, on the side plate sections 40, on the plane orthogonal to the bottom plate section 38 so that this is also considered advantageous in view of preventing any influence over the images to be displayed on the display screen of the liquid crystal panel 22.

Moreover, when the reflection plate 32 is viewed from above, the rib 46 is located outside of the bottom plate section 38 but in the outline of the side plate sections 40 so that this is also considered advantageous in view of preventing any influence over the images to be displayed on the display screen of the liquid crystal panel 22.

As such, as shown in FIG. 2A, compared with the previous configuration, an overlap amount L0 of the diffusion plate 36 for abutment against the reflection plate 32 can be kept large without increasing a width L1 of the first abutment plane 44 so that the liquid crystal panel 22 can be increased in area on the display screen.

Accordingly, advantageously, the liquid crystal panel 22 can be increased in screen size, and the liquid crystal display device 20 can be reduced in size with the width reduction of the rectangular-frame-shaped front panel 14.

Second Embodiment

Described next is a second embodiment of the invention.

Figure 3A:
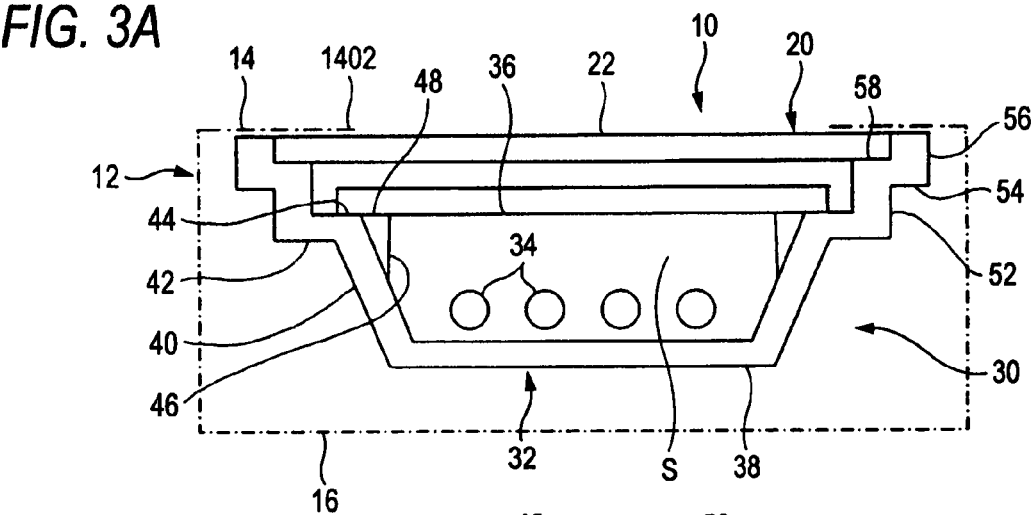
FIG. 3A is a cross sectional view of the liquid crystal display device 20 of a second embodiment of the invention.
Figure 3B:
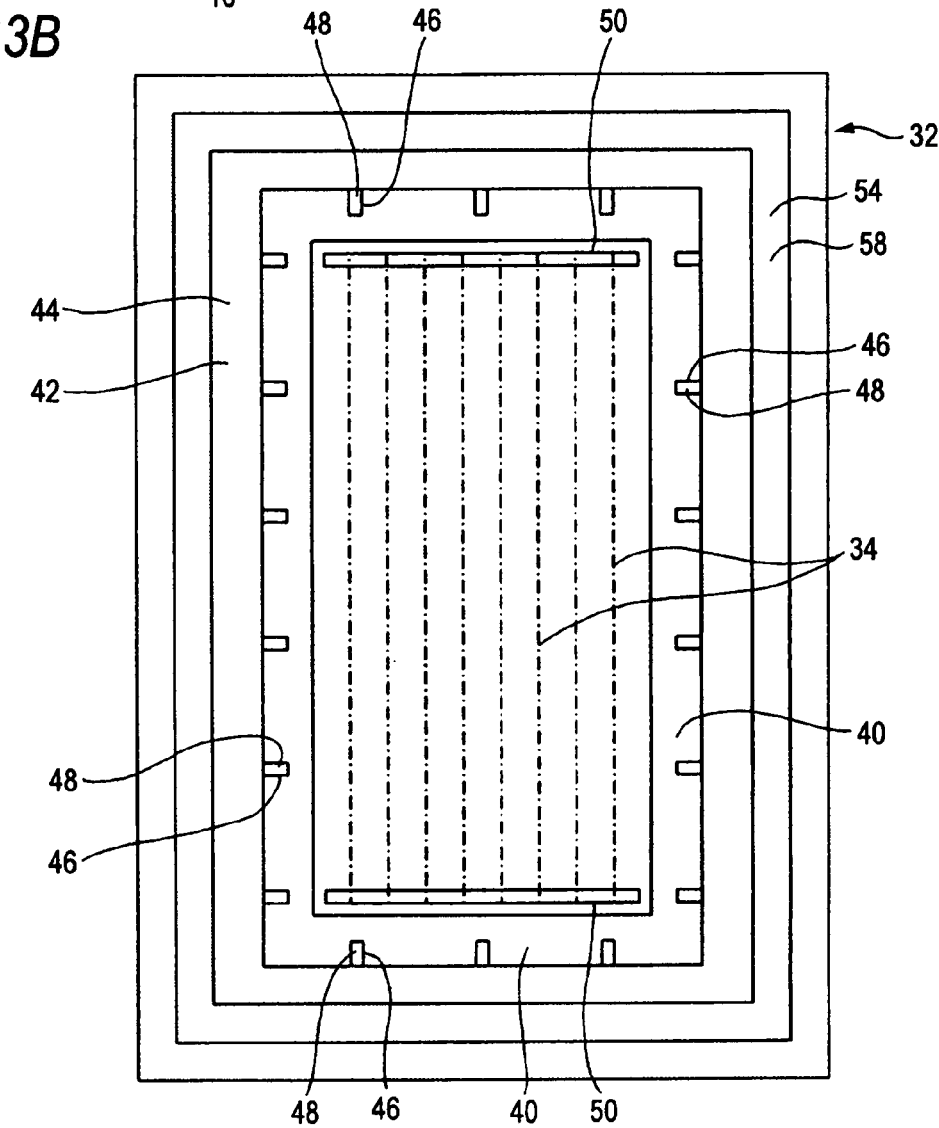
FIG. 3B is a plan view of the liquid crystal display device 20 of FIG. 3B.

FIG. 3A is a cross sectional view of the liquid crystal display device 20 of the second embodiment of the invention, and FIG. 3B is a plan view thereof.

In the second embodiment, the difference from the first embodiment lies in the respect that the reflection plate 32 is provided with an abutment plane for abutment of the liquid crystal panel 22. The remaining configuration is the same as that of the first embodiment. Any components similar to those in the first embodiment are provided with the same reference numerals, and not described twice.

The liquid crystal display device 20 for use in the television unit 10 is configured to include the liquid crystal panel 22 and the backlight unit 30. As shown in FIGS. 3A and 3B, the reflection plate 32 configuring the backlight 30 is configured to include, in addition to the components described in the first embodiment, i.e., the bottom plate section 38, the side plate sections 40, and the edge plate section 42, a first upright wall 52, an outer edge plate section 54, and a second upright wall 56. The first upright wall 52 is provided upright from the outer edge of the edge plate section 42, and the outer edge plate section 54 protrudes from the tip end of the first upright wall 52 toward outside thereof. The second upright wall 56 is provided upright from the outer edge of the outer edge plate section 54. These components, i.e., the first upright wall 52, the outer edge plate section 54, and the second upright wall 56, are configured as a piece to the reflection plate 32.

A plane extended in a rectangular-frame shape which is one of the sides of the outer edge plate section 54 located away from the bottom plate section 38 in the thickness direction, is formed as a third abutment plane 58 for abutment by the liquid crystal panel 22. The liquid crystal panel 22 is disposed inside the chassis 12 with the four sides thereof abutted against the third abutment plane 58.

In the second embodiment, the diffusion plate 36 is disposed by being abutted, at four sides, against the first and second abutment planes 44 and 48 using a holder, a lug piece, and others embedded in the reflection plate 32, for example. Note here that such a diffusion plate 36 can be of any known various configurations in terms of component placement.

Further, the liquid crystal panel 22 is disposed by being abutted against the outer edge plate section 54 using a holder, a lug piece, and others embedded in the reflection plate 32, for example. Note here that such a liquid crystal panel 22 can be of any known various configurations in terms of component placement.

In the second embodiment, the liquid crystal panel 22 is incorporated to the reflection plate 32, and thus such components are equipped in the liquid crystal device 20 as a piece. This is considered advantageous in view of simplifying the configuration and reducing the number of components. In such a second embodiment, the rib 46 is provided to the inner plane of each of the side plate sections 40 of the reflection plate 32, and the rib 46 is formed with the second abutment plane 48 so that the effects similar to those of the first embodiment can be also derived, i.e., the liquid crystal panel 22 can be increased in screen size, and the liquid crystal display device 20 can be reduced in size.

Note here that described in the second embodiment is the case that all of the four side plate sections 40 are each provided with the rib 46 including the second abutment plane 48. This is surely not restrictive, and at least one side plate section 40 may be provided with the rib 46 including the second abutment plane 48.

Note here that described in the second embodiment is the case that all of the four side plate sections 40 are each provided with a plurality of ribs 46 each including the second abutment plane 48. Alternatively, when the diffusion plate 36 is small in size, one side plate section 40 may be provided with the rib 46 including the second abutment plane 48.

In the embodiments of the invention, described is the case that the liquid crystal display device 20 is applied to a television unit. The invention is surely applicable not only to imaging devices such as monitor device for a desktop personal computer, a notebook personal computer, a video camera and a digital still camera equipped with a liquid crystal display device, PDAs (Personal Digital Assistants), mobile phones, and others, but also to various many types of electronic devices including a liquid crystal display device.

It should be understood by those skilled in the art that various modifications, combinations, sub-combinations and alterations may occur depending on design requirements and other factors insofar as they are within the scope of the appended claims or the equivalents thereof.

The invention claimed is:

1. A backlight unit for use in a liquid crystal display device, comprising:
    a reflection plate;
    a plurality of fluorescent tubes; and
    a diffusion plate, wherein
    the reflection plate includes
    a rectangular-shaped bottom plate section,
    four side plate sections respectively formed upright from four sides of the bottom plate section with a skew in the direction of moving away from the bottom plate section, and
    an edge plate section that protrudes from a tip end of each of the side plate sections toward outside thereof,
    an open space is formed by the bottom plate section and the four side plate sections in the tip end direction of the side plate sections,
    the fluorescent tubes are disposed above the bottom plate section in the space,
    a side which is one of the sides of the edge plate section in the thickness direction and is located away from the bottom plate section is formed as a first abutment plane against which the diffusion plate is abutted,
    at a portion of at least one of the four side plate sections closer to an inner surface of the edge plate section facing the space, a rib is protruded from the inner surface in the space,
    an end portion where the rib is away from the bottom plate section is extended on a plane same as the first abutment plane, and is formed as a second abutment plane for abutment by the diffusion plate, and
    the diffusion plate is disposed by being abutted against the first abutment plane at four sides, and by being abutted against the second abutment plane thereat.

2. The backlight unit for the liquid crystal display device according to claim 1, wherein
    when the reflection plate is viewed from above, the rib is located outside of the bottom plate section but in an outline of the side plate sections.

3. The backlight unit for the liquid crystal display device according to claim 1, wherein
the rib is provided as a piece with the side plate sections.

4. The backlight unit for the liquid crystal display device according to claim 1, wherein
the rib is provided to each of the side plate sections.

5. The backlight unit for the liquid crystal display device according to claim 1, wherein
the rib is provided plurally to each of the side plate sections at regular intervals.

6. The backlight unit for the liquid crystal display device according to claim 1, wherein
the edge plate section extends throughout a length of the tip end of each of the four side plate sections, and forms a rectangular frame when viewed from above, and
the rib is provided plurally in a direction along which the edge plate section is extended at regular intervals.

7. The backlight unit for the liquid crystal display device according to claim 1, wherein
the rib has a length in a direction protruding into the space from the inner plane, and a width in a direction orthogonal to the protruding direction, and
the second abutment plane has a width shorter than the length of protruding.

8. The backlight unit for the liquid crystal display device according to claim 1, wherein
on the side plate section, the rib is extended on a plane orthogonal to the bottom plate section.

9. The backlight unit for the liquid crystal display device according to claim 1, wherein
the first abutment plane is extended on a plane parallel to the bottom plate section.

10. A liquid crystal display device, comprising:
a chassis;
a liquid crystal panel equipped inside the chassis with a display screen thereof facing a front aperture of the chassis; and
a backlight unit disposed inside the chassis and at the rear of the liquid crystal panel, wherein
the backlight unit includes
a reflection plate,
a plurality of fluorescent tubes, and
a diffusion plate,
the reflection plate includes
a rectangular-shaped bottom plate section,
four side plate sections respectively formed upright from four sides of the bottom plate section with a skew in the direction of moving away from the bottom plate section, and
an edge plate section that protrudes from a tip end of each of the side plate sections toward outside thereof,
an open space is formed by the bottom plate section and the four side plate sections in the direction of the liquid crystal panel,
the fluorescent tubes are disposed above the bottom plate section in the space,
a side which is one of the sides of the edge plate section in the thickness direction and is located away from the bottom plate section is formed as a first abutment plane against which the diffusion plate is abutted,
at a portion of at least one of the four side plate sections closer to an inner surface of the edge plate section facing the space, a rib is protruded from the inner surface in the space,
an end portion where the rib is away from the bottom plate section is extended on a plane same as the first abutment plane, and is formed as a second abutment plane for abutment by the diffusion plate, and
the diffusion plate is disposed by being abutted against the first abutment plane at four sides, and by being abutted against the second abutment plane thereat.

11. A reflection plate configuring a backlight unit for use in a liquid crystal display device, being made of a material with a high reflection coefficient, and comprising:
a rectangular-shaped bottom plate section;
four side plate sections respectively formed upright from four sides of the bottom plate section with a skew in the direction of moving away from the bottom plate section; and
an edge plate section that protrudes from a tip end of each of the side plate sections toward outside thereof, wherein
a space for placement of a fluorescent tube is formed open by the bottom plate section and the four side plate sections in the tip end direction of the side plate sections,
a side which is one of the sides of the edge plate section in the thickness direction and is located away from the bottom plate section is formed as a first abutment plane,
at a portion of at least one of the four side plate sections closer to an inner surface of the edge plate section facing the space, a rib is protruded from the inner surface in the space, and
an end portion where the rib is away from the bottom plate section is formed as a second abutment plane being extended on a plane same as the first abutment plane.

12. The liquid crystal display device according to claim 10, wherein the reflection plate further include a first upright wall, an outer edge plate section, and a second upright wall,
in which the first upright wall is provided upright from an outer edge of the edge plate section, the outer edge plate section protrudes outwardly from a tip end of the first upright wall, and the second upright wall is provided upright from an outer edge of the outer edge plate section, and
in which a plane having one side of the outer edge plate section located away from the bottom plate section in the thickness direction is formed as a third abutment plane, and
in which the liquid crystal panel is abutted against the third abutment plane.

13. The reflection plate according to claim 11, further comprising a first upright wall, an outer edge plate section, and a second upright wall,
in which the first upright wall is provided upright from an outer edge of the edge plate section, the outer edge plate section is provided to protrude outwardly from a tip end of the first upright wall, and the second upright wall is provided upright from an outer edge of the outer edge plate section, and
in which a plane having one side of the outer edge plate section located away from the bottom plate section in the thickness direction is formed as a third abutment plane.

* * * * *